United States Patent Office 2,856,470
Patented Oct. 14, 1958

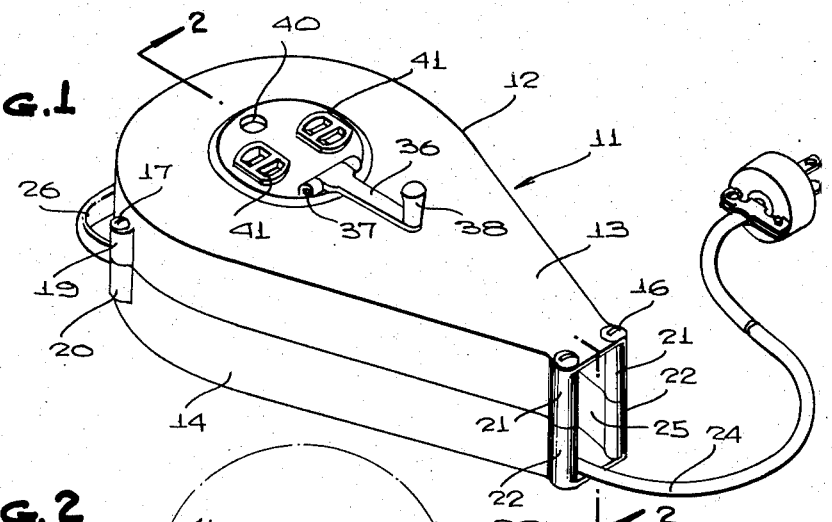

2,856,470

EXTENSION CORD ASSEMBLY

Stanley R. Hyde, National City, Calif.

Application July 20, 1956, Serial No. 599,079

4 Claims. (Cl. 191—12.4)

This invention relates to an improved extension cord reel of the type having a protective housing into which the cord is reeled when not extended.

A main object of the invention is to provide a more practical and efficient cord reel assembly of this kind which is simple in construction, compact in size, and which can be made in attractive, rugged, and serviceable forms at relatively low cost.

Further objects and advantages of the invention will become apparent from the following description and the accompanying drawings, wherein:

Figure 1 is a perspective view of an improved extension cord reel assembly constructed in accordance with the present invention.

Figure 2 is an enlarged vertical longitudinal cross sectional view taken on the line 2—2 of said figure.

Figure 3 is a horizontal cross sectional view taken on the line 3—3 of Figure 2.

Figure 4 is a fragmentary perspective view of a modification of the assembly of the present invention, wherein the housing member is provided with receptacles for three-prong plugs.

Referring to the drawings, and more particularly to Figures 1, 2 and 3, 11 designates an improved extension cord reel assembly according to this invention, comprising a relatively flat housing 12, of tear-drop or segmental shape, comprising a top section 13 and a bottom section 14, the sections being pan-shaped, with the bottom section mating with the top section and being secured thereto by screws 16 and 17 traversing aligned lugs 19 and 20 at one end of the housing 12, and aligned lugs 21 and 22 on the other end of the housing. As shown in Figures 1 and 3, the lugs 21 and 22 at the narrower forward ends of the housing sections 13 and 14 define parallel spaced rounded guides between which the flexible electrical extension cord 24 is guided into and out of the housing 12, through one opening 25 in the narrower or smaller end of the housing.

The wider rear portion of the housing is semi-circular in plan and is provided with a handle 26.

The bottom wall 14' of the bottom section 14 has centrally of the semi-circular rear portion of the housing an upstanding pivot post 27, rising from the apex of a conical base 27' fixed to the wall 14 on which is rotatably mounted a reel 28, having on its top portion a cylindrical receptacle cup 29. The reel 28 comprises a hollow cylinder 45 having a lateral flange 33 on its open upper end baring rotatably against the underside of the top wall 13' of the upper housing section 13. The lower end of the cylinder 45 is closed by a conical wall 46 which conformably and rotatably bears upon the conical base 27'. The conical wall 46 is centrally apertured at 46' and has thereon a tubular journal 47 engaged on the pivot post 27. The bottom wall 46 is extended into an annular flange 48 which bears rotatably on the bottom wall 14' of the lower housing section 14, and serves as a reel head.

The side wall of the cylinder 45 is annularly indented near the flange 33 to provide a laterally inwardly extending ridge 49 which cooperates with a groove 50 provided in the side wall of the cup 29, whereby the cup 29 is retained removably in the upper end of the reel cylinder 45. The cup 29 has a bottom wall 34 resting upon the upper end of the journal tube 47. The cup 29 has an upper end wall 31 which is extended to provide a lateral annular flange 31' which bears rotatably upon the upper surface of the top wall 13' of the upper housing section. This top wall 13' has an opening 51 in which the side wall 32 of the cup 29 is journaled. The top wall 31 of the cup 29 has outlet receptacle 41 engaged therethrough and contained within the cup.

Designated at 36 is a handle arm which is hingedly connected at one end, as indicated at 37, to an eccentric part of the top wall 31 of the cup 29, and has on its opposite end a rotatable knob 38 which is receivable in an aperture 40 provided in the top wall 31 of the cup 29 when the arm 36 is folded to a position overlying the top wall 31 of the cup 29.

When it is desired to reel in the extension cord 24, the handle arm 36 is swung to the outwardly extending position thereof shown in Figure 1, and the knob 38 grasped and the handle arm rotated so as to rotate the reel 28 and wind the cord thereon.

The extension cord 24 extends into the reel 28 through a grommeted opening 52 in the side wall of the reel cylinder 45, at a point below the cup 29, and enters the cup 29 through an opening 53 provided in the bottom wall 34 of the cup. Within the cup 29 the wires of the cord 24 are connected in suitable manner to the receptacles 41. In the form of the invention shown in Figure 4 instead of two-prong outlet receptacles 41, three-prong receptacles 41 are provided in the cup 29.

While certain specific embodiments of the invention have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In an extension cord reel assembly, a housing having top and bottom walls, a pivot post fixed on and rising from said bottom wall, said top wall having a circular opening concentric with said pivot post, a reel comprising a vertical cylinder having upper and lower ends, said upper end being open, a lower end wall on the lower end of said cylinder, said lower end wall having thereon a laterally outwardly extending annular flange reaching laterally outwardly from the cylinder and bearing rotatably upon the bottom wall of the housing and serving as a reel head, a lateral flange on the upper end of said cylinder bearing rotatably against the underside of said top wall, said lower end wall of the reel cylinder having a central opening receiving said pivot post, a cylindrical cup seated in the open upper end of the cylinder and secured to the cylinder, said cup having a side wall journaled in the circular opening of the housing top wall, said culp having a lower end wall and an upper end, an upper end wall on the upper end of the cup having opening means therein, a lateral flange on the upper end of the cup bearing rotatably upon the upper surface of the housing top wall, outlet receptacle means in said cup and accessible through the opening means in the upper end wall of the cup, a flexible cord having an end portion located between the top and bottom walls of the housing and secured to the reel cylinder and traversing a wall of the cup and connected to said receptacle means, and handle means on the upper end wall of the cup for rotating the reel to wind and unwind said cord on the reel cylinder.

2. In an extension cord reel assembly, a housing having top and bottom walls, a pivot post fixed on and rising from said bottom wall, said top wall having a circular opening concentric with said pivot post, a reel comprising a vertical cylinder having upper and lower ends, said upper end being open, a lower end wall on the lower end of said cylinder, said lower end wall having thereon a laterally outwardly extending annular flange reaching laterally outwardly from the cylinder and bearing rotatably upon the bottom wall of the housing and serving as a reel head, a lateral flange on the upper end of said cylinder bearing rotatably against the underside of said top wall, said lower end wall of the reel cylinder having a central opening receiving said pivot post, a cylindrical cup seated in the open upper end of the cylinder and secured to the cylinder, said cup having a side wall journaled in the circular opening of the housing top wall, said cup having a lower end wall and an upper end, an upper end wall on the upper end of the cup having opening means therein, a lateral flange on the upper end of the cup bearing rotatably upon the upper surface of the housing top wall, outlet receptacle means in said cup and accessible through the opening means in the upper end wall of the cup, a flexible cord having an end portion located between the top and bottom walls of the housing and secured to the reel cylinder and traversing a wall of the cup and connected to said receptacle means, and handle means on the upper end wall of the cup for rotating the reel to wind and unwind said cord on the reel cylinder, the side wall of the reel cylinder and the lower end wall of the cup having openings therein through which said cord and portion passes.

3. In an extension cord reel assembly, a housing having top and bottom walls, a pivot post fixed on and rising from said bottom wall, said top wall having a circular opening concentric with said pivot post, a reel comprising a vertical cylinder having upper and lower ends, said upper end being open, a lower end wall on the lower end of said cylinder, said lower end wall having thereon a laterally outwardly extending annular flange reaching laterally outwardly from the cylinder and bearing rotatably upon the bottom wall of the housing and serving as a reel head, a lateral flange on the upper end of said cylinder, bearing rotatably against the underside of said top wall, said lower end wall of the reel cylinder having a central opening receiving said pivot post, a cylindrical cup seated in the open upper end of the cylinder and secured to the cylinder, said cup having a side wall journaled in the circular opening of the housing top wall, said cup having a lower end wall and an upper end, an upper end wall on the upper end of the cup having opening means therein, a lateral flange on the upper end of the cup bearing rotatably upon the upper surface of the housing top wall, outlet receptacle means in said cup and accessible through the opening means in the upper end wall of the cup, a flexible cord having an end portion located between the top and bottom walls of the housing, said reel cylinder side wall and the lower end wall of the cup having openings therein through which said cord end passes, said cord end being connected to said receptacle means, and handle means on the upper end wall of the cup for rotating the reel to wind and unwind said cord on the reel cylinder, the lower end wall of the reel cylinder having thereon an upstanding journal tube registered with said central opening in the lower end wall of the reel cylinder and journaled on said pivot post, said journal tube having an upper end on which the lower end wall of the cup rests.

4. In an extension cord reel assembly, a housing having top and bottom walls, a pivot post fixed on and rising from said bottom wall, said top wall having a circular opening concentric with said pivot post, a reel comprising a vertical cylinder having upper and lower ends, said upper end being open, a lower end wall on the lower end of said cylinder, said lower end wall having thereon a laterally outwardly extending annular flange reaching laterally outwardly from the cylinder and bearing rotatably upon the bottom wall of the housing and serving at a reel head, a lateral flange on the upper end of said cylinder, bearing rotatably against the underside of said top wall, said lower end wall of the reel cylinder having a central opening receiving said pivot post, a cylindrical cup seated in the open upper end of the cylinder and secured to the cylinder, said cup having a side wall journaled in the circular opening of the housing top wall, said cup having a lower end wall and an upper end, an upper end wall on the upper end of the cup having opening means therein, a lateral flange on the upper end of the cup bearing rotatably upon the upper surface of the housing top wall, outlet receptacle means in said cup and accessible through the opening means in the upper end wall of the cup, a flexible cord having an end portion located between the top and bottom walls of the housing, said reel cylinder side wall and the lower end wall of the cup having openings therein through which said cord end passes, said cord end being connected to said receptacle means, and handle means on the upper end wall of the cup for rotating the reel to wind and unwind said core on the reel cylinder, the lower end wall of the reel cylinder having thereon an upstanding journal tube registered with said central opening in the lower end wall of the reel cylinder and journaled on said pivot post, said journal tube having an upper end on which the lower end wall of the cup rests, said housing bottom wall having a conical base fixed thereon having an apex from which said pivot post rises, and the lower end wall of the reel cylinder having a conical portion conformably and rotatably bearing upon said conical base.

References Cited in the file of this patent

UNITED STATES PATENTS

| | | |
|---|---|---|
| 914,772 | Williamson | Mar. 9, 1909 |
| 1,620,562 | Licht | Mar. 8, 1927 |
| 1,730,104 | Wheat | Oct. 1, 1929 |
| 1,978,734 | Apple et al. | Oct. 30, 1934 |
| 2,589,500 | Landen et al. | Mar. 18, 1952 |
| 2,590,890 | Redo | Apr. 1, 1952 |